United States Patent [19]

Long

[11] 4,195,109
[45] * Mar. 25, 1980

[54] POLYMERIC ADHESIVE-COATED PAPER AND GYPSUM WALLBOARD PREPARED THEREWITH

[75] Inventor: William J. Long, Chicago, Ill.

[73] Assignee: United States Gypsum Company, Chicago, Ill.

[ * ] Notice: The portion of the term of this patent subsequent to Feb. 22, 1994, has been disclaimed.

[21] Appl. No.: 918,181

[22] Filed: Jun. 22, 1978

Related U.S. Application Data

[60] Continuation-in-part of Ser. No. 799,412, May 23, 1977, Pat. No. 4,119,752, which is a division of Ser. No. 491,097, Jul. 23, 1974, Pat. No. 4,051,291, which is a continuation of Ser. No. 221,324, Jan. 27, 1972, abandoned.

[51] Int. Cl.² .......................... B32B 7/14; B32B 31/12
[52] U.S. Cl. ................................. 428/198; 156/39;44;
428/211; 428/219; 428/513; 428/538
[58] Field of Search .................... 156/39, 44; 428/198,
428/201, 211, 512, 513, 538

[56] References Cited

U.S. PATENT DOCUMENTS

| 3,887,748 | 6/1975 | Swedenberg et al. | 156/39 |
| 4,009,062 | 2/1977 | Long | 156/39 |
| 4,117,183 | 9/1978 | Long | 156/39 |
| 4,119,752 | 10/1978 | Long | 156/39 |

*Primary Examiner*—William R. Dixon, Jr.
*Attorney, Agent, or Firm*—Samuel Kurlandsky; Robert H. Robinson; Kenneth E. Roberts

[57] ABSTRACT

A composition comprising an aqueous suspension of a polymeric adhesive composition such as a latex or emulsion is coated on a paper cover sheet in a selective pattern such that the composition is disposed only at limited areas of the bond liner surface, and wherein substantial areas of the bond liner surface are free of coating; the coated paper, either in the wet stage or after drying being used in the form of paper cover sheets to form gypsum wallboard by applying an aqueous slurry of calcined gypsum, which may be free of any additional adhesive material, to the coated surface and setting the gypsum, resulting in a gypsum wallboard having excellent adhesion between the paper cover sheets and the gypsum core.

20 Claims, 2 Drawing Figures

POLYMERIC ADHESIVE-COATED PAPER AND GYPSUM WALLBOARD PREPARED THEREWITH

RELATED APPLICATIONS

This application is a continuation-in-part of copending application U.S. Ser. No. 799,412, filed May 23, 1977, issued Oct. 10, 1978 as U.S. Pat. No. 4,119,752 which is a divisional application of U.S. Ser. No. 491,097, filed July 23, 1974, issued Sept. 27, 1977 as U.S. Pat. No. 4,051,291, which in turn is a continuation of U.S. Ser. No. 221,324, filed Jan. 27, 1972, now abandoned all of the applications being of the present inventor.

BACKGROUND OF THE INVENTION (1) Field of Invention

The present invention relates to gypsum wallboard and more particularly refers to a method for coating the bond liner surface of the paper cover sheet with a polymeric adhesive composition in a selected pattern, to the product formed thereby, and to gypsum wallboard formed by applying a calcined gypsum slurry to the coated bond liner surface of the paper cover sheet.

(2) Description of the Prior Art

Conventional wallboard manufacture has in the past been based on the theory that the wet and dry bond were one and the same, that the paper-to-core bond was mechanical and crystalline, and that drying calcined the crystalline bond to the point that the bond was essentially destroyed. To prevent this, starch was usually introduced into the core slurry and permitted to migrate to the paper-core interface to protect the gypsum crystals forming the mechanical bond. In contrast to this, it was disclosed in U.S. Ser. No. 799,412 of which this application is a continuation-in-part, that the paper-to-core bond actually proceeds in a two-step fashion, as follows. When the slurry is cast onto the paper cover sheets, and specifically the bond liner thereof, wet or green bonding will occur between the bond liner and the slurry due to hydrogen bonding, unless the paper is treated to prevent such hydrogen bonding. For example, any bond liner sizing tends to reduce such hydrogen bonding, and any film completely coating the liner eliminates the hydrogen bonding altogether. Upon drying the board in conventional high temperature kilns, no matter to what degree wet bonding existed prior to drying, it is all destroyed during drying. Thus, for dry bond to take place, a replacement for the destroyed hydrogen bonds must be introduced. Since the dry bond takes place between the bond liner and the gypsum core, the adhesive must be maintained at the paper-core interface until it cures or sets.

It was generally fund and disclosed in U.S. Ser. Nos. 221,324 and 491,097 that the adhesive must be coated upon the bond liner of the cover sheet in such a manner as to permit and maintain wet bonding of the cover sheet during the casting of the wallboard. This required that the adhesive must be non-film forming until it cures or sets, and must be for that reason applied in a discontinuous manner in order that a substantial area of the bond liner surface remains uncoated. The adhesive must further be one which will not migrate from the paper-core interface during the casting and drying of the wallboard, and yet one which will set or cure during the drying before the wet bond has been completely destroyed. As a result of the interplay of wet bonding and subsequent dry bonding, the wallboard is formed which, when dry, retains the adhesive in a discontinuous or spaced-apart or partially covered pattern at the core-to-paper interface, because of the non-migratory nature of the adhesive.

It was previously found that certain uncooked or raw starches and other adhesives are in fact non-migratory and therefore do not spread to completely cover the surface of the cover sheets, but when applied to selected areas leave substantial areas uncoated and free of the adhesive. Consequently a wallboard paper-to-core bond is formed which is uniformly free of "peelers" and paper "blows".

As disclosed in the prior applications referred to above, it was found that when a slurry of raw starch was coated on a paper cover sheet in a discontinuous pattern and in such a manner that substantial areas of the cover sheet were left uncoated even when dry, that the thus coated cover sheets could be utilized either in the wet or dried stage to form gypsum wallboard by applying an aqueous calcined gypsum slurry which itself did not contain starch to the coated paper cover sheets.

As further disclosed in the copending applications referred to, it was found that polyvinyl alcohol in a water solution can be used in place of starch to make coated paper cover sheets which can subsequently be utilized in making gypsum wallboard. In preparing the coated paper, the polyvinyl alcohol in the form of an aqueous solution is coated on the paper in the same manner as disclosed in the prior applications, that is, by applying the coating to limited areas of the paper cover sheet, while leaving substantial areas uncoated which provide wet bonding when the gypsum slurry is applied to the surface of the coated paper cover sheet.

In preparing adhesive-coated paper having substantial areas free of adhesive it has been found that an excellent product can be produced by providing the starch coatings in the form of discrete and definite "striped" patterns or designs wherein the stripes are substantially parallel to each other. It was found that such patterns could be applied to paper with better control and reproducibility by means of a grooved, resilient applicator roll using a direct roll coater.

As disclosed in copending application U.S. Ser. No. 799,412, that the discontinuous or incomplete coatings can be further improved by incorporating into the aqueous coating composition a small amount of finely ground gypsum either in the dihydrate or in the hemihydrate form, but particularly in the hemihydrate form. The incorporated gypsum material increases the viscosity of the coating composition and permits a better and more highly defined coating to be applied, which provides improved adhesion between the paper cover sheets and the gypsum core.

SUMMARY OF THE INVENTION

Accordingly, it is an object of the invention to provide an improved paper-covered gypsum wallboard and process for making the same, wherein the bonding of the paper to the gypsum core is predictable and relatively unaffected by variances in the board-making process or components.

A further object of the invention is to provide such an improved wallboard and process which are substantially more economical due to the elimination of unnecessary amounts of the components.

A related object of the invention is to provide such an improved wallboard and manufacturing process wherein the bonding of the paper to the gypsum core is based solely upon an adhesive located only at the paper-core interface, which adhesive permits proper wet bonding of the paper sheet during the process.

Still another object is to provide such a process, and an improved cover sheet for gypsum wallboard, wherein the cover sheet is coated with an adhesive and which when dry is capable of being roll-wrapped and shipped to a board processing station.

It is still further an object to provide a paper bond liner or cover sheet coated with an adhesive wherein the coating is applied and dried at limited areas of the paper and wherein substantial areas of the paper are free of adhesive.

It is still further an object to provide a coating composition for coating paper cover sheets with a polymeric adhesive having a viscosity within well defined limits, and which coating material can be used to provide coatings of certain limited areas adjacent areas free of coating, with well defined boundaries between them.

Still other objects and advantages will readily present themselves to one skilled in the art upon reference to the following specification and claims.

According to the invention it has been found that the bond liner of paper cover sheets may be provided with a superior coating at limited areas and having substantial areas of the paper uncoated by utilizing as a coating medium a composition comprising a synthetic polymer adhesive in the form of a latex or other water suspension wherein the adhesive is non-migratory when subjected to water after the adhesive is dried. The process results in a synthetic polymeric adhesive coated paper bond liner which can be used with a calcined gypsum slurry to produce excellent gypsum wallboard having excellent paper adhesion.

DESCRIPTION OF THE PREFERRED EMBODIMENTS

Figure 1:
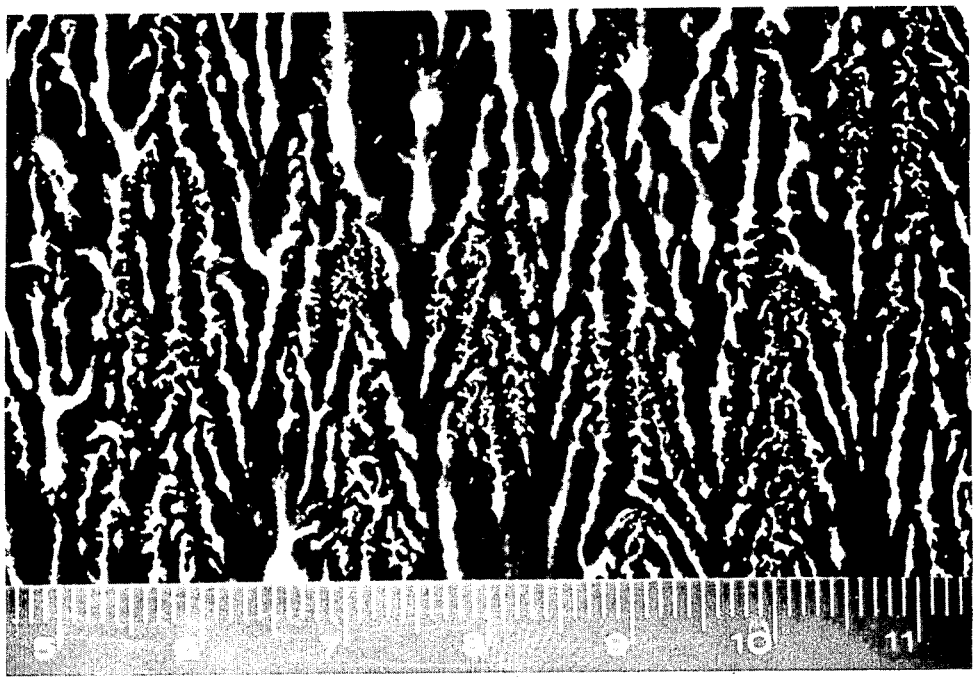
FIGS. 1 and 2 are photographs, enlarged 2.5 times, of a paper bond liner coated with an adhesive by alternate methods of the invention, prior to casting the stucco slurry thereover.
Figure 2:
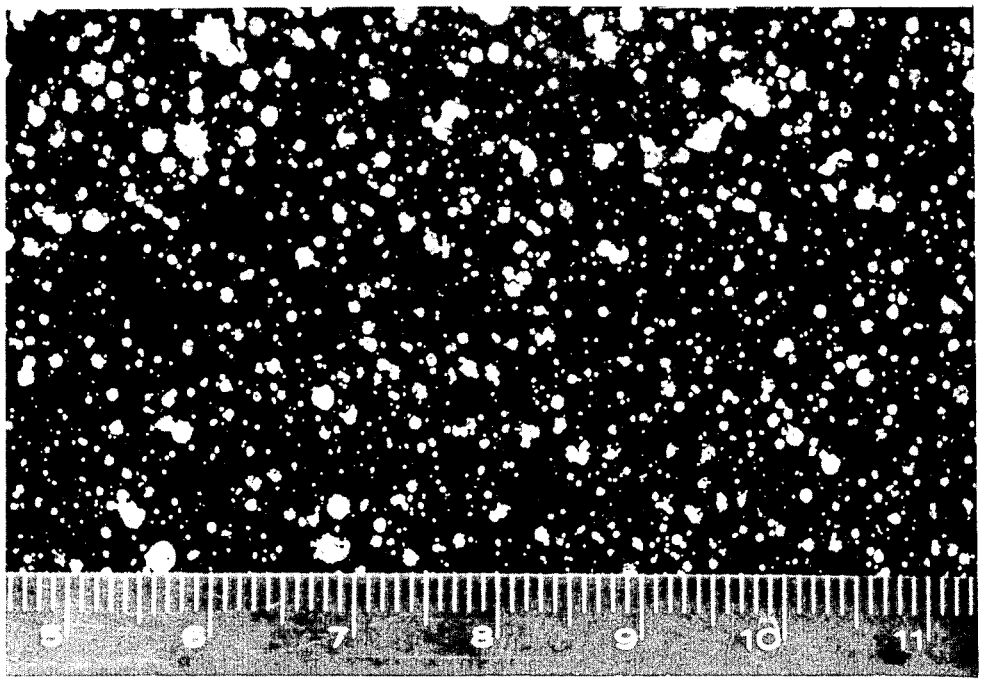

The invention is based upon a completely new concept of paper-to-core bonding. In the past wallboard production has been governed by the theory that wet and dry bond were one and the same and that the paper-to-core bond was mechanical and crystalline, and that drying had the tendency to calcine the crystalline bond to the point that the bond was essentially destroyed. To prevent this, starch was usually introduced into the core slurry and caused to migrate to the paper-core interface to protect gypsum crystals forming the mechanical bond. In contrast, it is presently believed that the paper-to-core bond actuallyproceeds in a two-step fashion, as follows. When the slurry is cast onto the paper cover sheets, and specifically the bond liner thereof, wet or green bonding will occur between the bond liner and the slurry due to hydrogen bonding, unless the paper is treated to prevent such hydrogen bonding. For example, any bond liner sizing tends to reduce such hydrogen bonding, and any film completely coating the liner eliminates the hydrogen bonding altogether. Upon drying the board in conventional high temperature kilns, no matter to what degree wet bonding existed before the drying process, all of it is destroyed. Thus, in order to realize dry bond, a replacement for the destroyed hydrogen bonds must be found. Such a replacement is the adhesive of the invention. Since the dry bond is between the bond liner and the gypsum core, the adhesive must be maintained at the paper-core interface until it cures or sets.

Turning now to the details of the invention, generally speaking the adhesive must be coated upon the bond liner of the cover sheet in such a manner as to permit and maintain wet bonding of the cover sheet during the casting of the wallboard. Specifically, this means first of all that the adhesive must be applied in a discontinuous or incomplete coating in a pattern having the coating composition at limited areas of the bond liner while leaving substantial areas free of the composition. Second, the adhesive composition utilized must be one which, upon the application thereto of the aqueous gypsum slurry, will not migrate and cover over the areas which have been left free of the coating in order to provide for wet bonding.

In accordance with the invention, it has been found that certain synthetic polymeric adhesives may be applied to limited areas of the bond liner of paper cover sheets while leaving substantial areas free of the adhesive. When a gypsum slurry is applied to the coated surfaces of the paper cover sheets, the adhesive does not migrate to spread over the uncoated areas. Instead, the uncoated areas remain uncoated and provide for wet bonding of the cover sheets to the gypsum slurry before the gypsum slurry has set. Subsequently, when the water is evaporated from the slurry and the slurry is set, excellent dry bonding is providing by a coated areas of the cover sheets to the set gypsum.

As used herein, the words "set" or "cure" mean the process by which the adhesive achieves its dry bonding strength.

EXAMPLES

The following examples are provided to illustrate the invention but are not intended to be limiting in any manner.

The following water-based lattices or emulsions were utilized in preparing coated paper and gypsum board according to the invention according to the process described below:

Example 1: A copolymer of vinyl acetate and ethylene
   (Airflex 400—Air Products and Chemicals)

Example 2: Vinyl acrylate
   ((LC-40-Rohm and Haas)

Example 3: Neoprene 102 (Polychloroprene) (Dupont)

Example 4: Carboxylated Butadiene-Styrene
   (Amsco 4150-Union Oil)

Example 5: Vinyl ethyl acrylate
   (Ucar 165-Union Carbide)

Example 6: Ethyl acrylate
   (Ucar 153-Union Carbide)

Example 7: Vinyl acetate
   (R-2383-H.B. Fuller)

Example 8: Acrylic Vinyl Acetate
   (Air-Flex 500 Air Products and Chemicals)

Each polymer latex was utilized to prepare the formulation as follows:

| | |
|---|---|
| Polymer Adhesive Latex | 20.0% |

| -continued | |
|---|---|
| Kelzan M | 0.25% |
| Durotex | 0.15% |
| Water | 79.60% |

The polymer adhesive as received in latex form was mixed in tap water at about 90° F. Kelzan M (Kelco Company) was added to increase the viscosity of the prepared solution to about 500 centipoises. Durotex 7603 (Ventron Corporation) was added as a preservative.

The polymer lattices listed in the Examples above were each in turn mixed with the other ingredients in the composition shown above and coated on paper cover sheets suitable for use in making gypsum wallboard. The coating was applied by means of a 26 inch wide B 1545 resilient rubber grooved roll having six grooves per inch, each of 0.010 inch depth and having 0.031 inch land widths. The coating operation comprised 25 inch wide paper sheets between the top resilient and a bottom smooth resilient roll. The grooved roll rotated in a reservoir of the liquid adhesive formulation contained between a steel doctor roll and the grooved applicator roll. Metal end plate dams were used to hold an adhesive reservoir of about 800 grams. The steel doctor roll was adjusted free and/or in contact with the grooved roll to promote adhesive depositions from the grooves only. The amount of total solution pick-up approximated 2.3–3.0 pounds per 1000 square feet of paper. This resulted in a coating of about 0.5–0.6 pounds of as-received polymer adhesive, or in terms of dry weight, about 0.25–0.3 pounds of adhesive solids per thousand square feet of paper, since the polymer latex adhesive listed above in the Examples generally contained about 50% solids. The coated papers were then dried. Alternatively, the coated papers may be utilized while still wet.

A conventional gypsum slurry was prepared comprising 600 grams calcium sulfate hemihydrate and 500 grams water, by mixing in a Lightnin mixer at 650 rpm for ninety seconds, additionally adding 1.3 grams of standard calcium sulfate dihydrate accelerator and 0.66 gram potassium sulfate accelerator. No starch at all was added. The slurry was mixed with Millifoam, a conventional foaming agent, to produce a slurry which when set and dry formed a gypsum board having a density of 48 pounds per cubic foot. The slurry was cast onto the pre-coated cover sheets and encased in a metal mold to form wallboard samples having a thickness of ½ inch. The boards were dried in an oven at 350° F. for fifty minutes until they had lost 70% of their original wet weight, followed by drying at 110° F. for 16 hours.

All the board samples formed from the various polymer latex adhesives listed above showed excellent bond results, even though no conventional starch adhesive had been utilized. Because the adhesives were non-migratory, and were applied in discrete areas while leaving other discrete areas free of adhesive, good wet bonding resulted. Additionally, the dry bond results with all of the adhesive-coated papers were excellent. Humidified bond tests were made and the results were also satisfactory ranging 0–10% failure only, a figure which is considered satisfactory.

Other polymeric lattices or suspensions which may be utilized in the present invention are butadiene styrene, butadiene acrylonitrile, polyvinyl chloride, various acrylate and methacrylate esters, vinyl butlacrylate, vinyl maleate, vinyl fumarate, etc.

Gypsum board manufactured according to the present invention have a number of advantages over gypsum board prepared with starch incorporated in the gypsum slurry according to conventional processes. Because the adhesive is at the paper-gypsum interface, much less adhesive may be utilized than the amount of starch incorporated in a slurry. The polymer latex adhesives are non-migratory and consequently, when applied in discrete areas, do not migrate to cover the entire sheet and thereby defeat wet bonding, as is the case with a migratory water soluble adhesive. Although the cost of the polymers is somewhat higher than that of starch, when used in the present process less adhesive need be utilized than starch incorporated in the conventional manner. Additionally, while the cost of starch is progressively increasing, the cost of the polymers utilized in the present invention are continually decreasing.

It is to be understood that the invention is not to be limited to the exact details of composition, materials, or operations described, as obvious modification and equivalents will be apparent to one skilled in the art.

Invention is claimed as follows:

1. In a panel comprising a rehydrated gypsum core securely bonded to a paper cover sheet by an adhesive disposed at the interface of said core and said cover sheet, the improvement wherein said adhesive is applied to said cover sheet as a latex or aqueous suspension of a polymer and is disposed at limited areas of said interface, the amount of adhesive present at said limited areas being sufficient to provide secure bonding of said paper cover sheet to said gypsum core when said adhesive has set, and wherein substantial areas of said interface are free of said adhesive, said free areas being sufficient to provide wet bonding of said cover sheet to said core prior to the setting of said adhesive, the portion of said paper cover sheet spaced from said interface being substantially free of adhesive.

2. The improved panel as defined in claim 1, wherein said adhesive is present in an amount of at least about ½ pound per thousand square feet of paper cover sheet and is nonmigratory when applied to said cover sheet and processed to form a panel by heating up to at least about 170° F.

3. The improved panel as defined in claim 1, wherein said polymer is vinyl acetate.

4. The improved panel as defined in claim 1, wherein said polymer is ethyl acrylate.

5. The improved panel as defined in claim 1, wherein said polymer is polychloropropene.

6. The improved panel as defined in claim 1, wherein said polymer is a copolymer of butadiene and styrene.

7. The improved panel as defined in claim 1, wherein said polymer is vinyl acrylate.

8. The improved panel as defined in claim 1, wherein said polymer is vinyl ethyl acrylate.

9. The improved panel as defined in claim 1, wherein said polymer is acrylic vinyl acetate.

10. A process for producing gypsum wallboard comprising the following steps:

a. providing at least one paper cover sheet having a bond liner and applying a coating of an adhesive which is a latex or aqueous suspension of a synthetic polymer by calendering to provide a pattern having said adhesive at limited areas of said bond liner while leaving substantial areas free of said adhesive, b. casting an aqueous slurry of calcium sulfate hemihydrate on said paper cover sheet over said bond liner with the water from said aqueous slurry establishing wet bonding between said slurry and the uncoated portions of said bond liner, and c. setting said slurry to form a core and setting said adhesive to establish an adhesive bond between said core and said paper cover sheet at the limited areas containing said adhesive.

11. The process as defined in claim 10, wherein said adhesive is present in an amount of at least about ½ pound per thousand square feet of paper cover sheet and is non-migratory when applied to said cover sheet and processed to form a panel by heating up to at least about 170° F.

12. The improved panel as defined in claim 10, wherein said polymer is vinyl acetate.

13. The improved panel as defined in claim 10, wherein said polymer is ethyl acrylate.

14. The improved panel as defined in claim 10, wherein said polymer is polychloropropene.

15. The improved panel as defined in claim 10, wherein said polymer is a copolymer of butadiene and styrene.

16. The improved panel as defined in claim 10, wherein said polymer is vinyl acrylate.

17. The improved panel as defined in claim 10, wherein said polymer is vinyl ethyl acrylate.

18. The improved panel as defined in claim 10, wherein said polymer is acrylic vinyl acetate.

19. The improved process as defined in claim 10, wherein said step of coating includes the step of coating the bond liner in a pattern comprising dispersed and discrete areas only, which areas amount to substantially less than 100% of the total surface area, and dispersed and discrete areas free of adhesive whereby wet bonding of the bond liner to the core slurry takes place at the areas free of the adhesive.

20. The improved process as defined in claim 10, wherein said coating step includes the steps of drying the paper cover sheet, roll-winding the cover sheet, and thereafter unwinding the same and using it in said casting step.

* * * * *